United States Patent [19]

Neko

[11] Patent Number: 4,785,221

[45] Date of Patent: Nov. 15, 1988

[54] DRIVE CONTROL DEVICE OF INJECTION MOLDING MACHINE DRIVEN BY SERVO MOTOR

[75] Inventor: Noriaki Neko, Hino, Japan

[73] Assignee: Fanuc Ltd., Minamitsuru, Japan

[21] Appl. No.: 12,671

[22] PCT Filed: Apr. 25, 1986

[86] PCT No.: PCT/JP86/00212

§ 371 Date: Dec. 23, 1986

§ 102(e) Date: Dec. 23, 1986

[87] PCT Pub. No.: WO86/06318

PCT Pub. Date: Nov. 6, 1986

[30] Foreign Application Priority Data

Apr. 26, 1985 [JP] Japan ................................. 60-88914

[51] Int. Cl.⁴ ............................................. H02P 5/00
[52] U.S. Cl. .................................. 318/311; 318/567; 318/302
[58] Field of Search ............... 318/561, 567, 563, 565, 318/569, 600, 603, 606, 625, 626, 301, 302, 309, 311, 310

[56] References Cited

U.S. PATENT DOCUMENTS

| | | | |
|---|---|---|---|
| 4,338,556 | 7/1982 | Hetzel | 318/603 |
| 4,347,470 | 8/1982 | Kohzai et al. | 318/603 |
| 4,398,138 | 8/1983 | Kohzai et al. | 318/603 |
| 4,413,213 | 11/1983 | Baumgarten, Jr. | 318/310 |
| 4,445,075 | 4/1984 | Fry | 318/603 |
| 4,504,772 | 3/1985 | Matsuura et al. | 318/603 |
| 4,556,830 | 12/1985 | Schwalm et al. | 318/329 |
| 4,649,327 | 3/1987 | Ishii | 318/310 |
| 4,670,694 | 6/1987 | Asai | 318/311 |
| 4,726,187 | 2/1988 | Reinhardt et al. | 318/310 |
| 4,751,442 | 6/1988 | Kurakake | 318/567 |

*Primary Examiner*—William M. Shoop, Jr.
*Assistant Examiner*—David Martin
*Attorney, Agent, or Firm*—Staas & Halsey

[57] ABSTRACT

A drive control device of an injection molding machine which uses a servo motor (M1, M2, M3) as a drive source. The drive control device can prevent the injection molding machine from becoming uncontrollable when the serve performance of the servo motor is degraded, and prevent the operation speeds of the respective functions of the injection molding machine from exceeding a preset value. The servo motor (M1, M2, M3) is driven in accordance with an output from a servo circuit (10, 11, 12) including an error register (21) for storing a difference between a move command (a) from a control unit (1) and an actual shift amount (b) of the servo motor. When a value stored in the error register is read out by the control unit, it is compared with a predetermined value, and if discriminated to exceed the predetermined value, supply of the move command from the control unit is temporarily stopped.

2 Claims, 2 Drawing Sheets

DRIVE CONTROL DEVICE OF INJECTION MOLDING MACHINE DRIVEN BY SERVO MOTOR

BACKGROUND OF THE INVENTION

1. Field of Invention

The present invention relates to a driving device of an injection molding machine and, more particularly, to a drive control device of an injection molding machine which uses servo motors as a drive source for driving the injection mechanism, the screw rotating mechanism, the die clamping mechanism, and so on of the injection molding machine.

2. Description of the Relative Art

A conventional injection molding machine is driven by hydraulic pressure, and its drive control is performed by controlling the pressure of hydraulic fluid. However, another conventional injection molding machine has also been developed which uses a servo motor as its drive source. In this type of injection molding machine, when a move command is supplied from a control unit, the drive mechanism for a screw, a die clamping unit and the like of the injection molding machine may not for some reason move as requested by the move command. In that case, the drive mechanism may become uncontrollable. Also, overshooting may occur when the servo motor, and hence, the drive mechanism are accelerated, and the operation speed of the drive mechanism may exceed a preset speed.

SUMMARY OF THE INVENTION

It is an object of the present invention to prevent, in an injection molding machine having a drive mechanism for a screw, and a die clamping unit and the like which are driven by a servo motor, a control unit which controls the drive mechanism from being disabled, and to prevent the drive mechanism from operating at a speed exceeding a preset speed.

In order to achieve the above object, according to the present invention, in an injection molding machine which drives a servo motor as a drive source in accordance with an output from a servo circuit including an error register for storing a difference between a move command from a control unit and an actual shift amount of the servo motor, whether or not a value stored by the error register which is read out by a readout means exceeds a predetermined value is discriminated by discriminating means and, when the stored value is discriminated to exceed the predetermined value, supply of the move command from the control unit is temporarily stopped by stop means.

In this manner, according to the present invention, when the servo motor cannot sufficiently respond to a move command from the control unit, and when the servo motor, i.e., the drive mechanism for an injection mechanism, a die clamping mechanism and the like that are driven by the servo motor, does not follow the move command, output of the move command is temporarily stopped before control of the servo motor and the drive mechanism by the control unit is disabled. As a result, the injection molding machine does not become uncontrollable.

DESCRIPTION OF THE PREFERRED EMBODIMENTS

Figure 1:
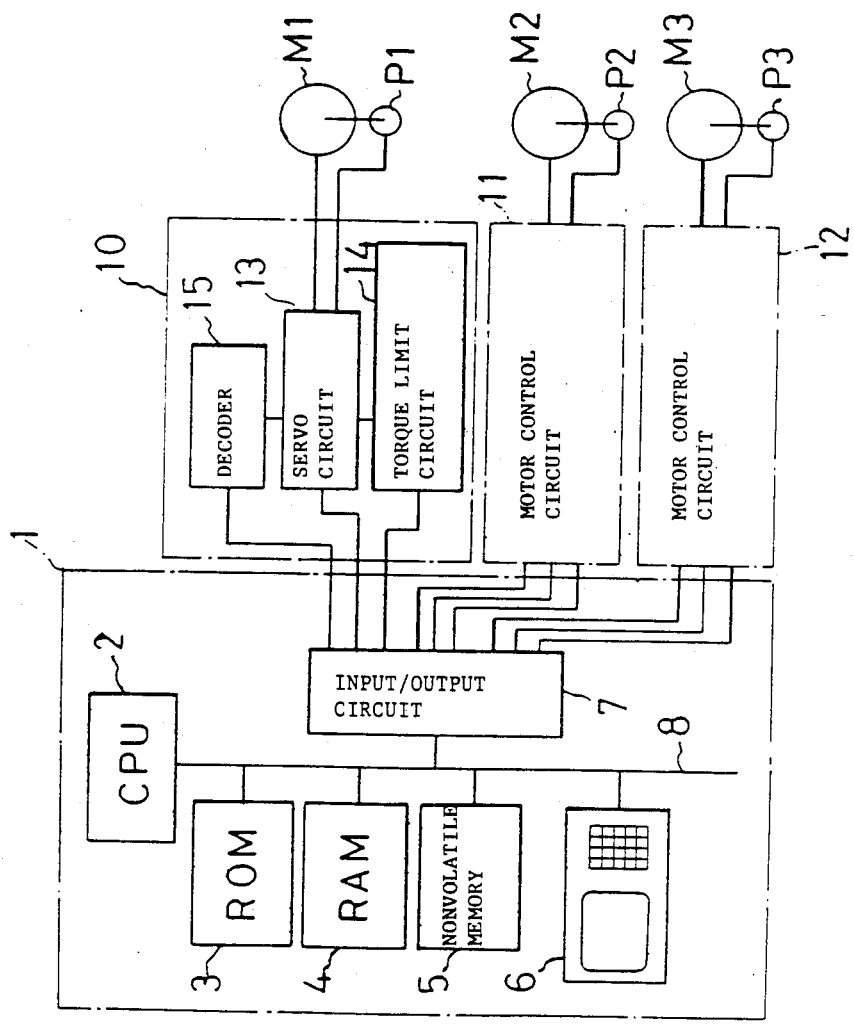
FIG. 1 is a block diagram illustrating a main part of a drive control device of an injection molding machine according to an embodiment of the present invention.

FIG. 1 shows a drive control device of an injection molding machine according to an embodiment of the present invention. Referring to FIG. 1, reference numeral 1 denotes a control unit such as a CNC (a computer-incorporating numerical control unit) having a central processing unit (to be referred to as a CPU hereinafter) 2, a ROM 3 for storing a control program which controls the entire injection molding machine, a RAM 4 for temporarily storing data, a nonvolatile memory 5 for storing an NC program and various preset values, an MDi&CRT (an operation panel with a display) 6, and an input/output circuit 7. These components 2 to 7 are connected to each other through a bus 8. The input/output circuit 7 is connected to a servo circuit 13, a torque limit circuit 14, and a decoder 15 that will be described later in each of motor control circuits 10, 11, and 12.

Reference symbols M1, M2, and M3 denote servo motors for driving the injection mechanism, the screw rotation, and the die clamping mechanism, respectively. The servo motors M1, M2, and M3 are connected to the motor control circuits 10, 11, and 12, respectively. The motor control circuits 11 and 12 have the same arrangement as the motor control circuit 10, and their internal arrangements are not shown. Reference symbols P1, P2, and P3 denote plulse encoders.

Figure 2:
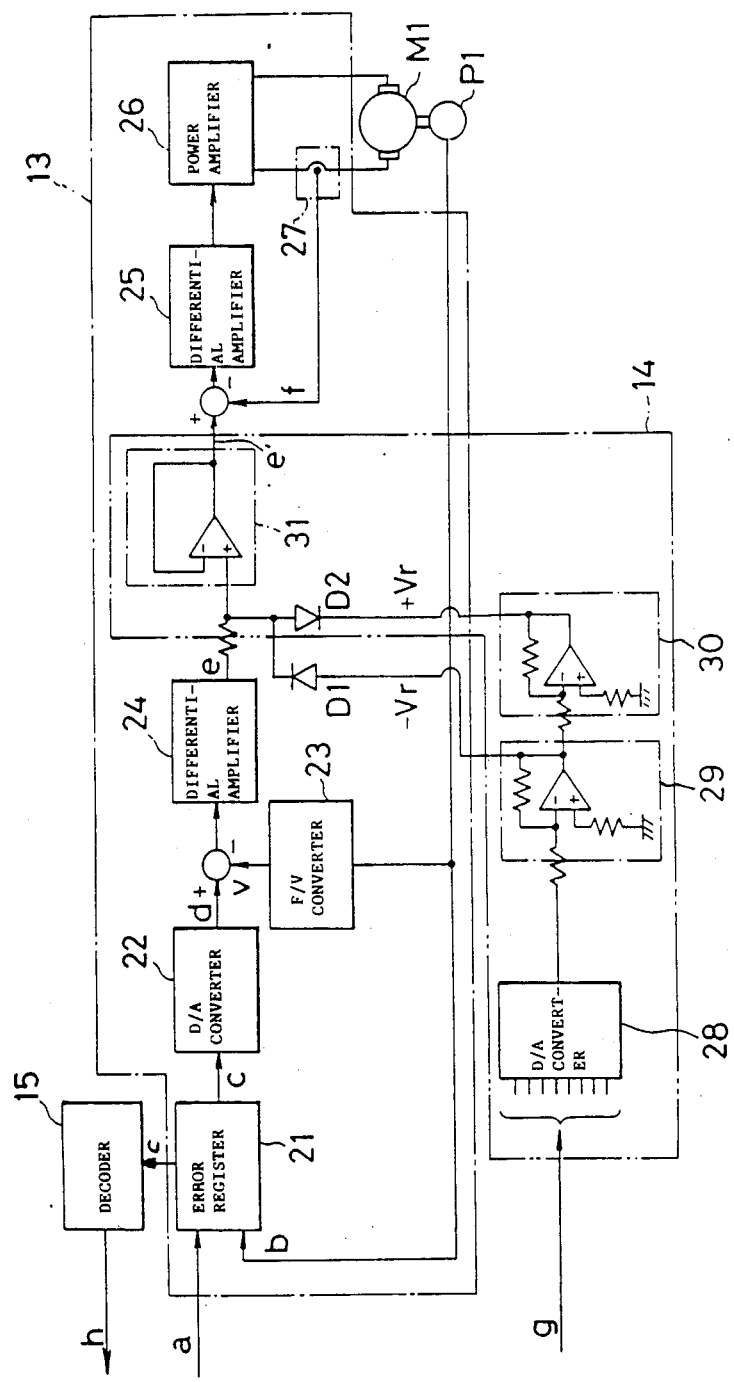
FIG. 2 is a block circuit diagram showing in detail the motor control circuit of an injection servo motor shown in FIG. 1.

FIG. 2 shows the motor control circuit 10 in detail. Reference numeral 13 denotes a servo circuit having substantially the same arrangement as a conventionally known servo circuit. The servo circuit 13 is different from a conventional servo circuit in that the torque limit circuit 14 is added to it. The operation of the servo circuit 13 will be briefly described. Assume that a position command a is intermittently input from the control unit 1 (FIG. 1) to an error register 21 as a move command. The positionl command a represents a target shift amount per unit time and consists of a pulse train. Then, the servo circuit 13 subtracts a shift amount b of the servo motor M1, which is detected by the pulse encoder P1, from the position command a, and converts a difference c (=a−b) into an analog voltage as a speed command value d by a D/A converter 22. More specifically, when the difference c between the position command a and the shift amount b of the servo motor M1 which is supplied from the pulse encoder P1 is large, the servo circuit 13 outputs a large speed command value d. When the difference between the position command a and the shift amount b is small, that is, when the shift amount b becomes close to the position command a, the servo circuit 13 outputs a small speed command value d. The servo circuit 13 performs speed feedback in order to improve the response time. In accordance with the speed feedback, a signal from the pulse encoder P1 is converted into a voltage v by an F/V converter 23, the voltage v corresponding to the actual speed of the servo motor M1 is subtracted from the speed d, and the obtained difference, i.e., the difference between the command speed and the actual speed v is amplified by a differential amplifier 24 and output as a torque command e.

As described above, in this embodiment, the torque limit circuit 14 is provided to saturate a torque command e exceeding a predetermined value and hence not to output it, thereby limiting the output. A torque command e' output in this manner is output as a voltage corresponding to a current flow to the armature of the servo motor M1. In order to further improve the response time with respect to the torque command e', a voltage f, supplied from a current detector 27 which detects the armature current of the servo motor 27 and corresponding to the armature current, is fed back. A difference between the torque command e' and the feedback signal f of the armature current is amplified by a differential amplifier 25 and a power amplifier 26, and is used to control the servo motor M1.

In the torque limit circuit 14, a torque limit command g suppled from the control unit 1 is converted by a D/A converter 28 into an analog signal as a current output. The obtained analog signal is converted by a current-/voltage converter 29 into a negative voltage $-Vr$ corresponding to the value of the torque limit command g. The sign of the negative voltage $-Vr$ is converted by a sign converter 30 to obtain a positive voltage $+Vr$ corresponding to the torque limit command g. The negative and positive voltages $-Vr$ and $+Vr$ are input to a buffer 31 via diodes D1 and D2, respectively. Reference numeral 15 denotes a decoder for decoding the value stored in the error register 21. The decoder 15 feeds back its decoder output h ($=c$) to the control unit 1.

The operation for driving the injection unit of the injection molding machine of this embodiment will now be described.

As described above, the position command a, i.e., the pulse train representing the target shift amount per unit time is applied to the error register 21 which stores the shift value. When an output from the pulse encoder P1, which represents the shift amount b of the servo motor M1, is applied to the register 21, the register 21 subtracts that value from the stored value. The servo motor M1 is driven as described above in accordance with the resulting value, which is now stored in the error register 21. When the torque command e from the differential amplifier 24 is decreased or increased to be less than the torque limit value $-Vr$ or to exceed the torque limit value $+Vr$, the corresponding one of the diodes D1 and D2 of the torque limit circuit 14 is turned on. When the diode D1 or D2 is turned on, the torque command e is limited to the torque limit value $-Vr$ or $+Vr$, and the servo motor M1 cannot output a torque exceeding $-Vr$ or $+Vr$. This prevents, e.g., an injection pressure from exceeding preset pressure and degrading the quality of the mold product.

Assume that, a move command is supplied from the control unit 1, but the servo motor M1 is not driven for any number of reasons to sufficiently follow the position command a as the move command. Then, a large value is stored in the error register 21. In this manner, when a value stored in the error register 21 becomes large, the control unit 1 may become uncontrollable. In order to prevent this, the CPU of the control unit 1, which serves as readout, discriminating, and stop means, repeatedly reads the value stored in the error register 21 via the decoder 15 at a predetermined interval, and compares the stored value with a first predetermined value preset in the nonvolatile memory 5, thereby discriminating whether the stored value exceeds the first predetermined value. When it is discriminated that the stored value exceeds the first predetermined value, indicating that the servo motor M1 does not sufficiently follow the position command a, a supply of the position command a is stopped. Until the content of the error register 21 is decreased to be less than a second predetermined value, also preset in the memory 5 and less than the first predetermined value, which represents that the servo motor M1 is following the position command a, the position command a is not output. This command supply prohibiting function is performed by using the feed stop function of the NC control unit.

Assume that, e.g., the number of pulses per revolution of the servo motor M1 is 2,000 (pulse/revolution), the maximum speed of the servo motor M1 is 1,200 (revolution/min), and the servo loop gain as the constant determined by a servo system is 1,800 (/min). Then, a normal position error ERR at the maximum speed is:

$$\begin{aligned} ERR &= \{2000 \text{ (pulse/revolution)} \times \\ &\quad 1200 \text{ (revolution/min)}\}/\{1800 \text{ (/min)}\} \\ &= 1333.3 \text{ (pulses)} \end{aligned}$$

Assume that the sum of the normal position error ERR and a pulse distribution with respect to the maximum speed of the motor within one period for reading the value stored in the error register 21 is defined feed stop amount FS. Also assume that this feed stop amount equals the first predetermined value, the second predetermined value also has this value, the value stored in the error register in the above embodiment is read out at every two pulse distribution periods, and a pulse distribution period is 8 msec. Then feed stop amount FS is:

$$\begin{aligned} FS &= ERR + 2,400,000 \text{ (pulse/min)} \times \\ &\quad 1/60 \text{ (min/sec)} \times 0.016 \text{ (sec)} \\ &= ERR + 640 \text{ (pulses)} \\ &= 1973.3 \text{ (pulses)} \end{aligned}$$

Thus, the feed stop amount FS, i.e., the first and second predetermined values are set to be about 2,000 pulses.

As a result, pulse distribution and acceleration/deceleration control are temporarily stopped when the feed stop value exceeds 2,000. When the feed stop amount FS becomes less than 2,000 (the second predetermined value), pulse distribution and acceleration/deceleration control are resumed.

The above explanation is made on the motor control circuit 10 of the servo motor M1 for injection driving. However, the same applies to the motor control circuits 11 and 12 of the servo motors M2 and M3 for screw rotation and die clamping. When one servo motor is set in a feed stop state, all the remaining servo motors are also set in the feed stop state.

As described above, when a value exceeding the first predetermined value is stored in the error register 21, in other words, when the servo motors M1 to M3 are not driven as requested, pulse distribution and acceleration/deceleration control are temporarily stopped before the control unit 1 becomes uncontrollable, and output of the position command a is stopped. Thereafter, when the value stored in the error register 21 becomes less than the second predetermined value, motor control is resumed.

When the servo motors M1 to M3 are to be accelerated quickly, a large value is stored in the error register 21. When this value exceeds the first predetermined value, supply of the position command a is stopped. Therefore, the rotating speeds of the servo motors M1 to M3 do not overshoot a preset speed, and the injection speed is not increased to exceed the preset speed.

In the above embodiment, the torque limit circuit 14 is used to limit the output torque of the servo motors M1 to M3. However, the drive control device of the present invention can also be constituted by using a normal servo circuit not having such a torque limit circuit 14. In this case, the above-described move command supply stop operation can be performed as well. However, when a torque limit is applied to a torque command in a servo circuit, the output torque of the servo motors M1 to M3 is limited, and the servo motors M1 to M3 often cannot sufficiently follow the move command. Therefore, the present invention is more effective if it is applied to control an injection molding machine of a type which has a torque limit circuit.

I claim:

1. A drive control device of an injection molding machine which drives a servo motor as a drive source in accordance with a drive control output from a servo circuit, which includes an error register for storing a difference between a move command signal from a control unit and an actual shift amount from said servo motor, comprising:

readout means for periodically reading out a value stored in said error register;

discriminating means for discriminating whether or not the readout value exceeds a predetermined value; and stop means for temporarily stopping supply of the move command signal from said control unit, when it is discriminated by said discriminating means that the readout value exceeds the predetermined value, after supply of the move command signal has been temporarily stopped, said discriminating means discriminates whether or not the readout value from said error register is less than a second predetermined value, which is less than the predetermined value, and said stop means cancels stoppage of the move command signal when the readout value is discriminated to be less than the second predetermined value.

2. A drive control device according to claim 1, wherein said servo circuit includes a torque limit circuit for limiting the drive control output from said servo circuit in response to a torque limit command from said control unit.

* * * * *